United States Patent

[11] 3,581,563

| [72] | Inventors | Christopher E. Christie<br>Akron;<br>William J. Head, Barberton; Donald K. Burgett, Tallmadge, Ohio |
|---|---|---|
| [21] | Appl. No. | 836,565 |
| [22] | Filed | June 25, 1969 |
| [45] | Patented | June 1, 1971 |
| [73] | Assignee | The Goodyear Tire & Rubber Company<br>Akron, Ohio |

[54] TIRE-TESTING APPARATUS
14 Claims, 7 Drawing Figs.

[52] U.S. Cl. ............................................. 73/146
[51] Int. Cl. ........................................G01m 17/02
[50] Field of Search ............................. 73/146, 8; 33/201.13, 201.14

[56] References Cited
UNITED STATES PATENTS

| 2,332,690 | 10/1943 | Bennett | 33/203.14 |
| 2,695,520 | 11/1954 | Karsai | 73/146 |
| 3,142,178 | 7/1964 | Gough et al. | 73/146 |
| 3,316,758 | 5/1967 | Wild | 73/146 |
| 3,375,714 | 4/1968 | Battasso | 73/146 |
| FOREIGN PATENTS ||||
| 507,477 | 6/1939 | Great Britain | 73/116 |
| 192,447 | 3/1967 | U.S.S.R. | 73/146 |

Primary Examiner—Louis R. Prince
Assistant Examiner—Daniel M. Yasich
Attorneys—F.W. Brunner and Michael L. Gill ABSTRACT: A method and apparatus for continuously measuring the lateral spring rate of a rotating tire. A tire is mounted on a rotatable tire support and urged against an anvil means which is mounted for rectilinear movement relative to a fixed support and in a line parallel to the rotational axis of the tire. Drive means are provided for rotating the tire and imparting the rectilinear motion to the anvil. Means are also provided for measuring the rectilinear movement and the force required to impart the movement. The foregoing abstract is not to be limiting the invention of this application, and in order to understand the full nature and extent of the technical disclosure of this application, reference must be made to the accompanying drawings and the following detailed description.

3,581,563

INVENTORS
CHRISTOPHER E. CHRISTIE
WILLIAM J. HEAD
DONALD K. BURGETT
BY Michael L. Gill
ATTORNEY

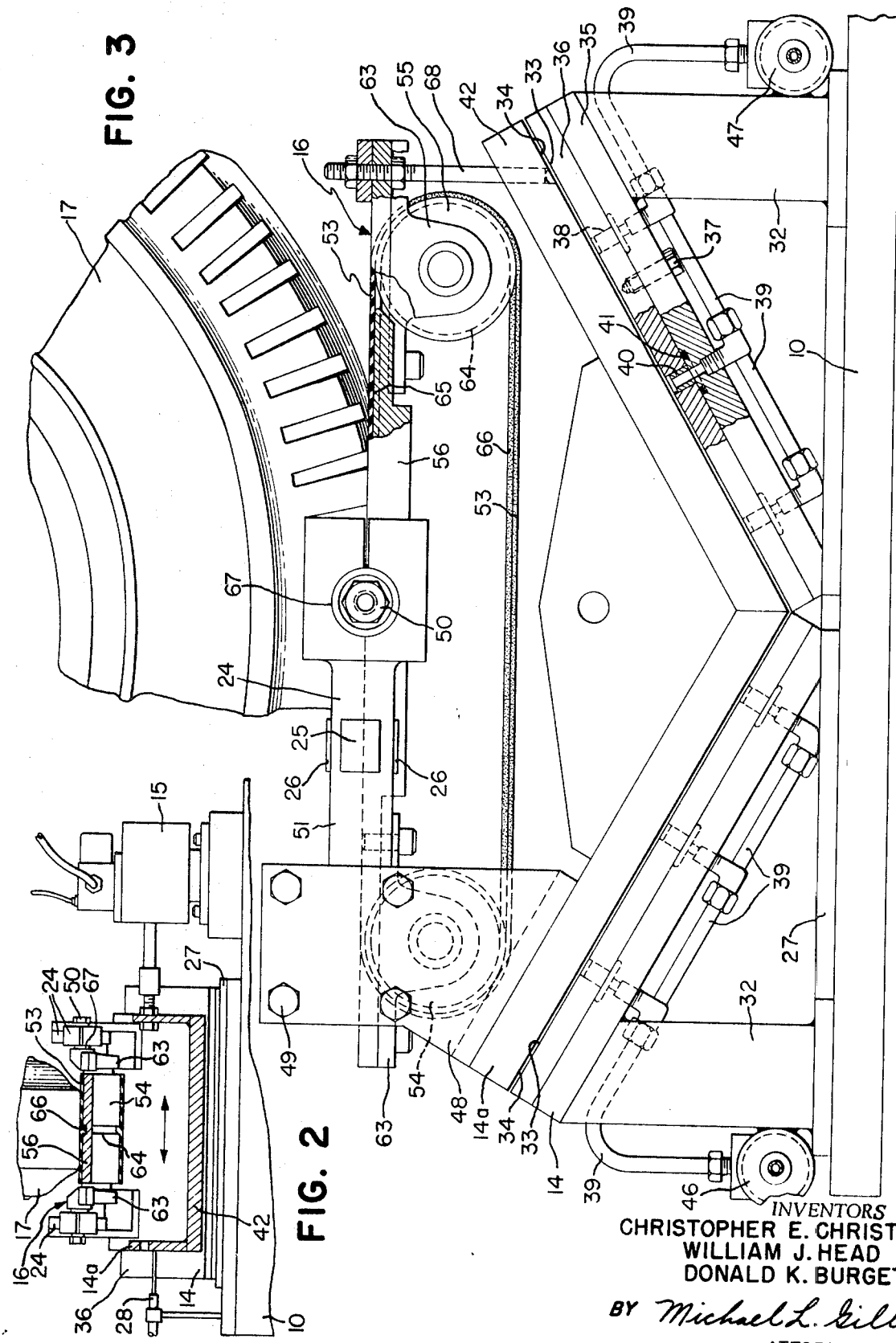

INVENTORS
CHRISTOPHER E. CHRISTIE
WILLIAM J. HEAD
DONALD K. BURGETT
BY Michael L. Gill
ATTORNEY

TIRE-TESTING APPARATUS

This invention relates to a method and apparatus for testing tires and more particularly, to a method and apparatus for determining the lateral spring rate of a rotating tire.

The general stability and controllability of an automobile is dependent in part upon the mechanical properties of its tires. One property of particular importance with this regard is the lateral stability; or, ability of the tire to resist deformation in the lateral direction, or, in other words, in the direction of the rotational axis of the tire. A measure of the lateral stability of the tire is the lateral spring rate. For purposes of this application, "lateral spring rate" shall mean the force in pounds exerted on the tread of a tire through the footprint thereof, and in a direction parallel to the rotational axis of the tire divided by the deflection in inches of the tread from its equilibrium position. In the past, the lateral spring rate of a tire has been measured with the tire in a nonrotating or static condition.

It is an object of this invention to provide a method and apparatus for accurately measuring the lateral spring rate of a rotating tire. It is a further object of this invention to provide a method and apparatus for more closely simulating normal operating conditions in measuring the lateral spring rate of a rotating tire. A further object of this invention is to provide an apparatus for supporting the tread of a rotating tire which is capable of substantially frictionless motion in the direction of the axis of the rotating tire but is also capable of resisting the rolling resistance forces caused by the rotating tire on the supporting surface.

The invention accordingly consists in the features of construction, combination of elements and arrangement of parts which will be exemplified in the construction hereafter set forth and the scope of the application of which will be indicated in the appended claims.

In the drawings:

FIG. 2 is a sectional view of the apparatus of FIG. 1 taken substantially along line 2–2;

FIG. 3 is an enlarged front elevational view of a portion of the apparatus of FIG. 1;

Figure 1:
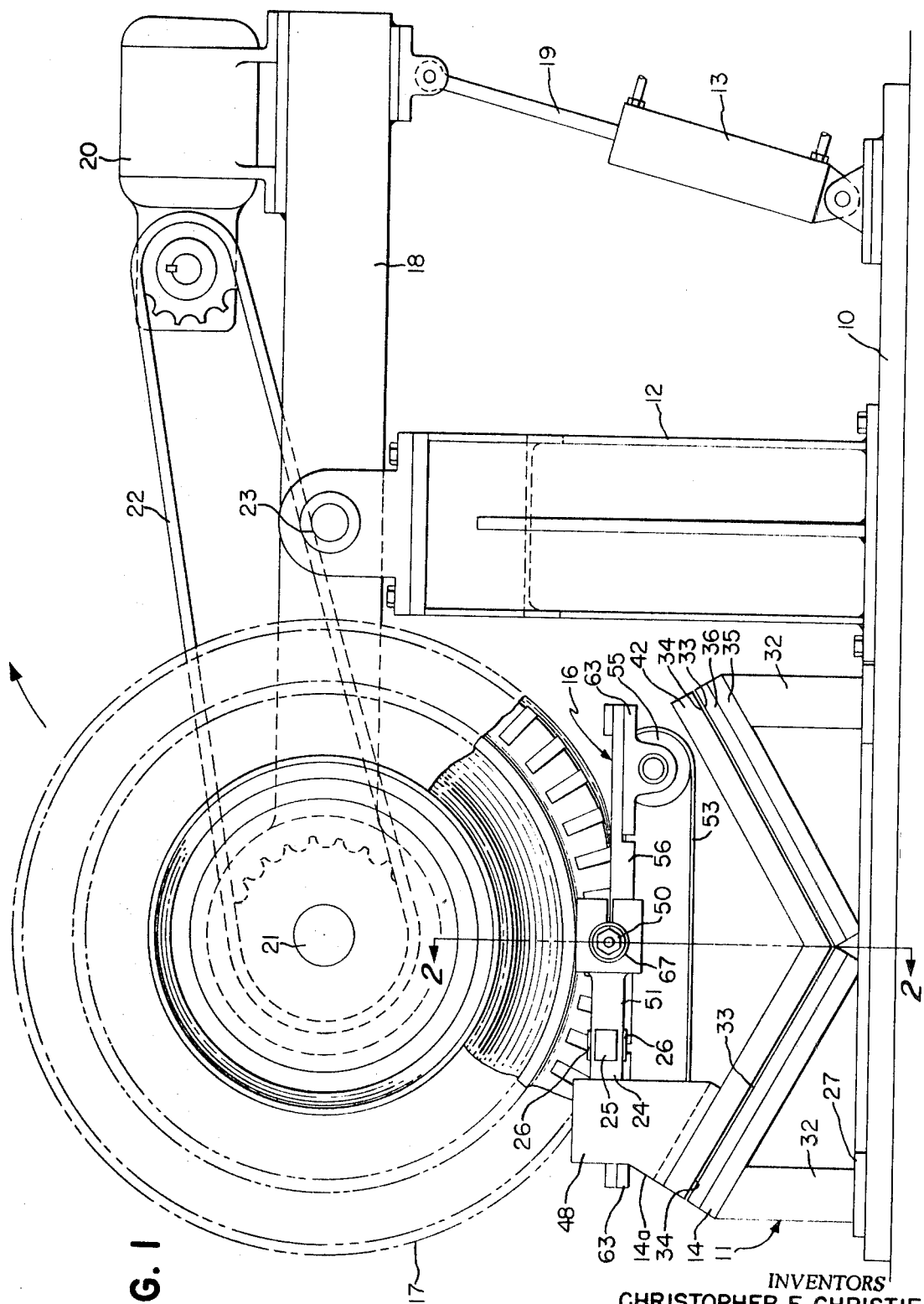
FIG. 1 is a front elevational view of an apparatus constructed in accordance with this invention.

With reference to the drawings, and in particular FIGS. 1 and 2, the apparatus of this invention comprises a bedplate 10 having a horizontal vibrating mechanism 11, an air cylinder 13 and an upstanding frame member 12 mounted therebetween. As best seen in FIG. 2, the horizontal vibrating mechanism 11 comprises a lower table or fixed support 14 rigidly mounted on a horizontal baseplate 27 and an upper table 14a which is mounted for rectilinear motion relative to the lower table 14 and in a horizontal direction. A hydraulic vibrator 15 is mounted on the base and connected to the upper table 14a to impart the horizontal rectilinear motion to the upper table 14a. An anvil or planar support means 16 is mounted on the upper table 14a in a manner to support a rotating tire 17. The vertical frame member 12 has a horizontal pivotal support or shaft 23 on its upper end which supports an arm 18 at its midpoint. The arm 18 carries a spindle 21 for rotatably supporting a tire 17 on one end which in turn engages the anvil 16. The opposite end of the arm 18 is pivotally connected to the plunger 19 of the air cylinder 13. A drive motor 20 is mounted on the top of the arm 18 above the air cylinder and is operably connected to the spindle 21 through a drive means 22. The air cylinder 13, when actuated, is capable of pivoting the arm 18 about its central pivot shaft 23 on the vertical frame member 12 and subsequently moving the tire 17 toward and away from the anvil 16.

Figure 6:
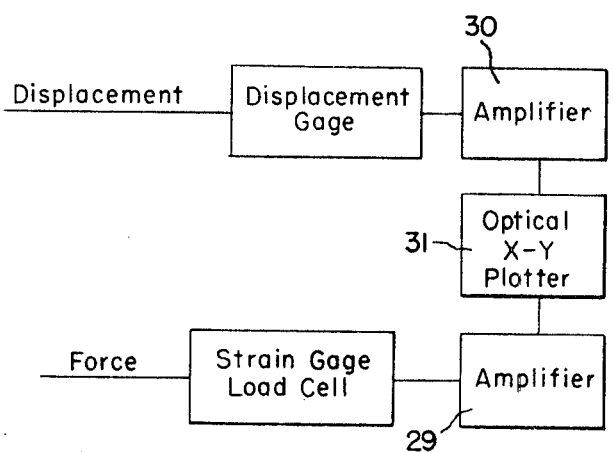
FIG. 6 is a block diagram of the electronic equipment utilized in the operation of the apparatus of this invention.

The anvil 16 is mounted on the upper table 14a by means of a pair of horizontal strain arms 24. Load cell strain gauges 25, 26 are mounted on the arms 24 and connected to suitable electronic equipment for the purpose of detecting the forces exerted by the tire on the anvil means. A displacement gauge 28 is mounted on the base 10 and in engagement with the upper table 14a for the purpose of measuring the movement or displacement of the table 14a. The displacement gauge 28 is also connected to suitable electronic equipment for detecting and recording the movement of the upper table. As illustrated in the block diagram of FIG. 6, signals representative of the force and displacement measurements are fed into amplifiers 29, 30 and then relayed to an optical XY plotter 31 for conversion into a stress-strain curve.

Figure 4:
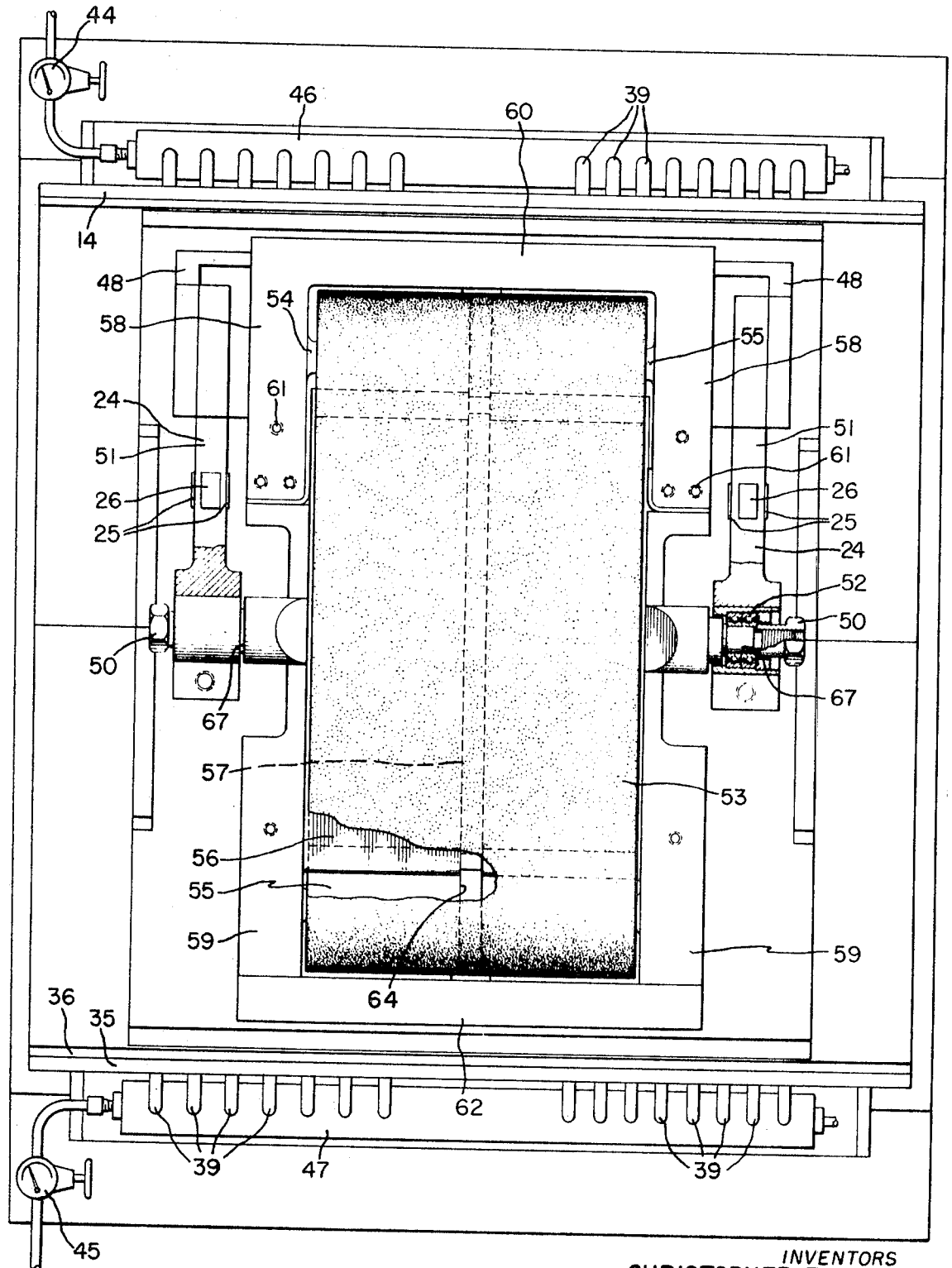
FIG. 4 is a partial top view of the apparatus of FIG. 3 with portions broken away.
Figure 5:
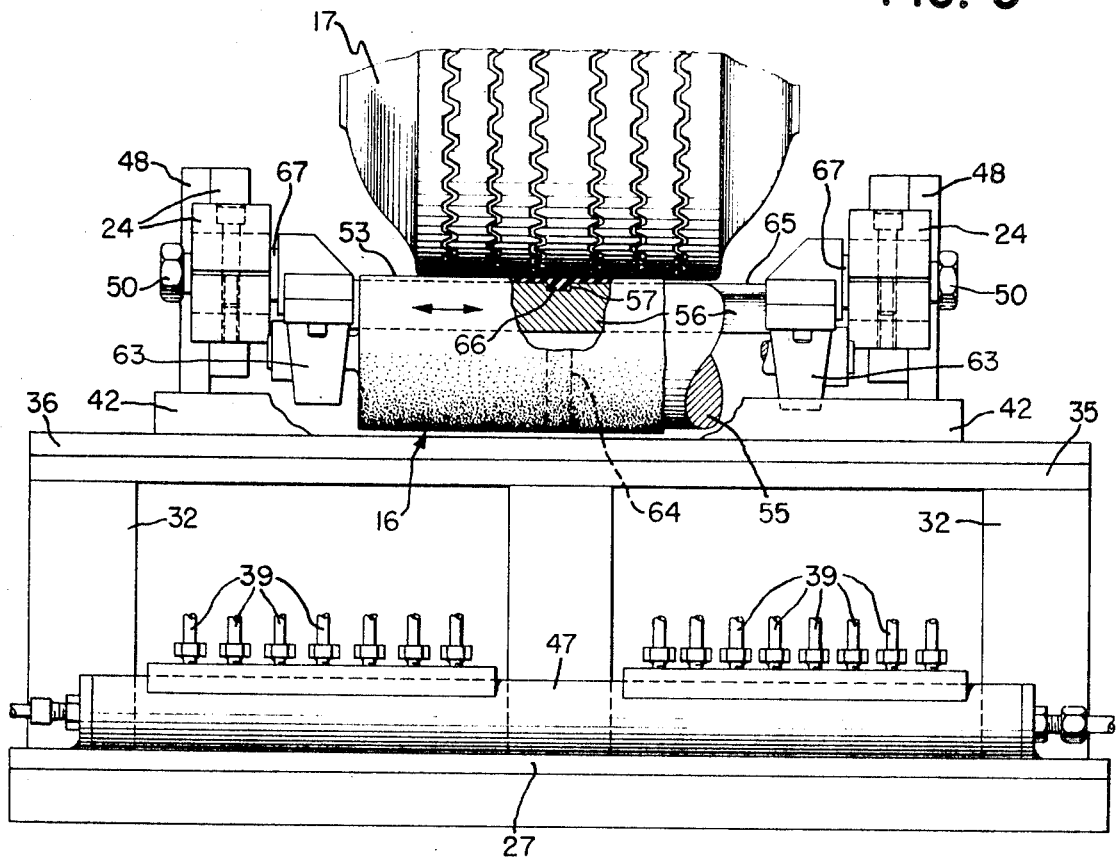
FIG. 5 is an end view of the apparatus of FIG. 3 with portions broken away.

More specifically and as illustrated in FIGS. 3, 4 and 5, the vibrating mechanism 11 comprises a generally horizontal baseplate member 27 having a lower support table or fixed support 14 rigidly mounted thereon by means of vertical legs 32. The lower support table 14 has a pair of oppositely inclined surfaces 33 on its upper side which face generally in opposite directions and toward each other and define a space therebetween which is uniform in cross section in planes normal to and spaced along an axis extending between and parallel to the aforementioned surfaces 33. For purposes of this specification, the axis extending between and parallel to the surfaces 33 will be referred to as the "major axis." The upper support table 14a is disposed immediately above the lower support table 14 and in mating relationship therewith; that is, the upper support table has a pair of oppositely inclined surfaces 34 on its bottom side facing generally in opposite directions and away from each other which mate with or conform very closely to the configuration of the lower surface 33 of the lower table. The lower surfaces 33 and upper surfaces 34 are ground smooth and conform very closely to each other to provide as frictionless a sliding surface as possible. This configuration of the upper and lower surfaces permits movement of the upper table 14a in directions parallel to the major axis but prevents its movement transverse to the major axis since to so move transversely would require that the table 14a lift up and out of the space formed by the lower surface 33. Such upward movement of the table 14a is prevented by the weight or the table 14a and the radial force of the tire 17 on the anvil 16.

As best seen in FIGS. 3, 4 and 5, in the specific embodiment illustrated, the lower support table 14 comprises a lower plate 35 and an upper plate 36. The lower plate 35 is rigidly secured to the baseplate 27 and the legs 32 as by welding. The upper plate 36 has its upper surfaces 33 ground flat and smooth as mentioned before. The bottom side of the upper plate 36 conforms to the upper side of the lower plate 35 and is secured thereto by means of bolts 37. A plurality of holes 38 extend perpendicularly through both plates 35 and 36 and communicate with a plurality of conduits 39 under the lower plate 35. Each hole 38 is provided with a replaceable orifice insert 40 in the upper side of the plate 36 for the purpose of facilitating changing the minimum diameter of the holes 38. An O-ring 41 is provided at the innerface of the plates 35 and 36 about each hole 38 to prevent leakage of fluid from the hole 38 through the innerface. The upper side of the upper plate 36 forms the aforementioned oppositely inclined lower surfaces 33 which in this particular embodiment, is a V-configuration in sections taken normal to and along the major axis.

A source of pressurized fluid (not shown) is connected to a pair of pressure-regulating valves 44 and 45. One pressure-regulating valve 44 is connected to a manifold 46 which in turn supplies fluid through a plurality of supply tubes or conduits 39 to the holes 38 in the underside of one side of the lower support table 14. The second pressure-regulating valve 45 is connected to a second manifold 47 which in turn supplies fluid through a plurality of tubes 39 to the holes 38 in the underside of the opposite side of the lower support table 14. Thus, the fluid pressure supplied through the holes in the two sides of the lower support table can be adjusted separately.

The upper table, also best seen in FIGS. 3, 4 and 5, comprises a plate 42 which in the specific embodiment illustrated is in the form of a V in sections taken normal to the major axis. The bottom sides of the plate 42 is ground smooth and flat to form the upper surface 34 which mates with and conforms to the lower surface 33.

A pair of parallel vertical sidewalls 48 are rigidly mounted on the ends of one side of the upper table 14a. The pair of parallel horizontal strain arms 24 are rigidly mounted at one end on the tops of the sidewalls 48 as by bolts 49. The free ends of the strain arms 24 are provided with coaxial clamping eyes 50. The common axis of the clamping eyes 50 is parallel to and lies directly above the bottom groove in the upper table 14a. Each strain arm 24 has a straight central portion 51 which is rectangular in cross section. A strain gauge 25 or 26, best seen in FIGS. 3 and 4, is mounted on each flat portion of the rectangular portion of each strain arm. The strain gauges 25 on the sides of the strain arms measure the differential in strain in opposite sides of the strain arms caused by the force required to distort the tire in the axial direction. The strain gauges 26 on the top and bottom of the strain arms measure the force exerted radially by the tire 17 on the anvil means 16. The four strain gauges 26 on the tops and bottoms of the strain arms 24 comprise a strain gauge load cell for measuring radial force. The four strain gauges 25 on the sides of the strain arms 24 comprise a strain gauge load cell for measuring the lateral or axial forces.

As best seen in FIGS. 3, 4 and 5, the anvil means 16 comprises a flexible endless belt 53 disposed about a pair of parallel rollers or pulleys 54, 55 and over a generally flat plate 56. The plate 56 has a straight rectangular groove 57 extending the length of the plate and in line with the longitudinal centerline of the plate. The four corners of the plate are each provided with a flat bearing plate 58 or 59 which extends out from the side and beyond the end of the plate 56. The bearing plates 58 on one end of the support plate 56 are connected at their outer ends by a transverse bar 60 and are removable from the plate 56 as a unit by removing bolts 61 which fasten them to the support plate 56. It is desirable that at least one set of bearing plates 58 or 59 be removable in order to facilitate installation of the belt 53. The bearing plates 59 at the opposite end are not removable but are connected at the outer ends by means of a second transverse flat bar 62 which is removable from the bearing plates. Pillow block bearings 63 are mounted on the bottom sides of the bearing plates and each pair of bearings supports one of the pair of rollers or pulleys 54, 55.

Each pulley has a rectangular circumferential groove 64 in its periphery which is in alignment with the groove 57 in the plate 56. The pulleys 54, 55 are mounted such that a line tangent to the tops of the pulleys lies in the same plane as the top surface 65 of the support plate. A rectangular-shaped rib 66 is molded in the back of and disposed the entire length of the belt along its longitudinal centerline. The rib is received in the grooves 57 and 64 in the flat plate and the pulleys. The grooves 57 and 64 in the plate and in the pulleys are slightly narrower than the rib 66 on the back of the flexible endless belt 53 in order to provide a slight press fit and prevent lateral movement of the belt 53 along the plate 56. A suitable lubricant such as castor oil, is supplied to the interface of the belt 53 and the flat plate 56 in order to prevent excessive friction as the belt slides along the flat plate. It should be noted that there is no brake or drive on either pulley and the belt is therefore free to rotate around the anvil 16. It also should be noted that the motion of the belt 53 is transverse to the major axis of the tables 14, 14a and, therefore, transverse to the rectilinear motion of the tables 14, 14a. This allows the tire to be rotated and at the same time have the tire tread deflected in directions transverse to the motion of the tread; or parallel to the rotational axis of the tire.

A pair of trunnions 67 are welded to the opposite sides of the plate 56 and have their common axis lying parallel to and midway between the pulleys 54, 55 and in the plane of the top surface of the belt 53. Each trunnion 67 is provided with a bearing arrangement 52 best seen in FIG. 4 which is clamped in the clamping eye 50 and pivotally supports the trunnions 67. The bearings 52 are mounted in a conventional manner to resist radial and axial thrust and thereby restrict the movement of the anvil 16 relative to the strain arms 24 to pivotal motion about the trunnion axis. This antifriction trunnion support means is provided in order to prevent any torque from being transmitted through the trunnion 67 to the strain arms 24 and distort the radial force readings.

In order to prevent oscillation of the anvil means 16, it is sometimes necessary to stabilize it by means of a pair of vertical threaded rods 68, each connected at one end to the center of one of the transverse bars 60, 62 and at the other end to the upper table 14a. It has been found that the presence of these stabilizing rods is not always necessary, but in any event, has no appreciable effect on the force readings.

Figure 7:
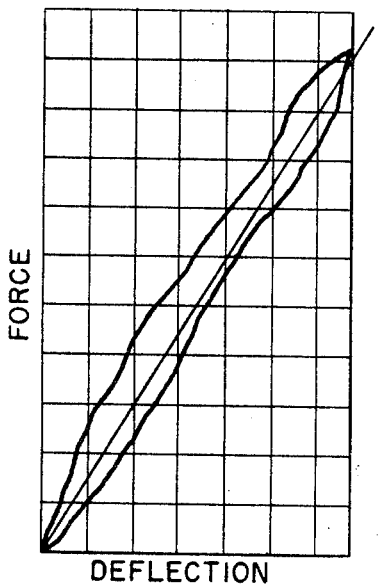
FIG. 7 is a lateral force-displacement graph of a typical tire test conducted on the apparatus of this invention.

In the operation of the apparatus, a tire 17 is mounted on the spindle 21 and inflated to the desired pressure. It is then rotated by means of the motor 20 and urged against the anvil 16 by the force of the air cylinder 13. As the rotating tire 17 engages the belt 53, any force in directions transverse to the major axis of the table 14a caused by the rotation of the tire on the anvil 16 is compensated for by adjusting the fluid or air pressure being supplied to the opposite sides of the table 14. When the table 14a is resting substantially on a film of fluid between the surfaces 33 and 34, the hydraulic vibrator is actuated to impart rectilinear motion to the upper table 14a in two directions parallel to the major axis. The radial force of the tire 17 on the anvil 16 keeps the upper table in the space between the surfaces 33 while the fluid film allows smooth and easy motion of the table 14a in directions parallel to the major axis. The rectilinear movement of the table 14a is transmitted through the anvil 16 to the tread resulting in flexing of the tire 17 in the area of the footprint in directions parallel to the rotational axis of the tire. As mentioned before, the displacement of the tread is measured by the displacement gauge 28 mounted on the base 10 and in engagement with the table 14a. The force required to displace the tread is measured by the lateral force strain gauges 25 which comprise a load cell. The force and displacement measurements are transmitted to their respective amplifiers and then to an optical XY plotter. The XY plotter plots a stress-strain curve similar to that illustrated in FIG. 7. The lateral spring rate is the slope of the curve or the force in pounds divided by the deflection in inches.

The apparatus of this invention can be used not only to determine the lateral spring rate of different tire structures under rotating conditions, but can also be used to determine the influence of other variables on the lateral spring rate. Such other variables that could be studied are r.p.m. of the tire, the radial load on the tire, the inflation pressure and the frequency and amplitude of the lateral distortion of the tread.

It will be obvious to one skilled in the art that many modifications can be made to the specific structure of this invention. For example, the V-shaped support tables 14 and 14a could open downwardly as opposed to opening upwardly as illustrated in the specific embodiment described. It also need not necessarily be V-shaped but could have other variations in shape, such as by way of example only a short, flat portion on the bottom of the V. At any rate, there could be various modifications to this specific structure without departing from the scope of this invention. Further, there could be various modifications to the planar support means such as a series of rollers or a multiplicity of ball bearings disposed in a single plane.

While certain representative embodiments and details have been shown for the purpose of illustrating the invention, it will be apparent to those skilled in the art that various changes and modifications may be made therein without departing from the invention.

I claim:

1. An apparatus for testing tires comprising: a first support having a first pair of oppositely inclined surfaces facing generally in opposite directions and toward each other to define therebetween a space which is uniform in cross section in planes normal to and spaced along an axis extending between and parallel to said pair of surfaces; a second support having a second pair of oppositely inclined surfaces receivable in said space in mating relationship with said first pair of surfaces; means for moving one support in opposite directions parallel to said axis and relative to the other support; means for directing pressurized fluid between said first and said second pair of surfaces to provide a film or fluid therebetween so as to allow for smooth and relative movement of said supports in a direction parallel to said axis; means for supporting a tire; anvil means for engaging the tread of said tire, said anvil means being mounted on said one support to deflect the tread of said tire in response to the movement of said one support in said opposite directions when said anvil means is engaged with said tread; and means for effecting relative movement between said anvil means and said means for supporting said tire in a direction toward and away from each other to cause said tread to engage and disengage said anvil means.

2. An apparatus a claimed in claim 1 wherein said means for supporting a tire includes means for mounting the tire for rotation about its rotational axis.

3. An apparatus as claimed in claim 2 wherein said anvil means includes rotatable means engageable with at least a portion of the tread of said tire.

4. An apparatus as claimed in claim 3 further including means for measuring the force exerted in moving said one support in said opposite directions.

5. An apparatus as claimed in claim 4 further including means for measuring the displacement of said anvil means in said opposite directions.

6. An apparatus as claimed in claim 5 wherein said means for supporting a tire serves to locate the tire with its rotational axis parallel to the line of motion of said one support in said opposite directions.

7. An apparatus as claimed in claim 1 wherein said inclined surfaces of said first and second pair thereof are flat.

8. An apparatus as claimed in claim 7 wherein said first pair of oppositely inclined surfaces are connected to form a V-configuration and said second pair of oppositely inclined surfaces are connected to form a V-configuration.

9. Apparatus for testing tires comprising: a fixed support; anvil means; means for supporting said anvil means on said support for reciprocating rectilinear movement relative thereto along a predetermined line; drive means for effecting said reciprocating rectilinear movement; support means for rotatably mounting a tire; means included in said anvil means for engaging the tread of said tire rotatably mounted on said support means; and means for effecting relative movement between said anvil means and said support means in a direction extending at right angles to said predetermined line to cause engagement of said tread and rotatable means and deflection of said tread in directions parallel to said predetermined line when said reciprocating rectilinear movement is imparted to said anvil means.

10. An apparatus as claimed in claim 9 wherein said rotatable means is operative to deform the tread of a tire in a manner to provide a substantially flat footprint, said rotatable means being engageable with said tire adjacent the ends of said footprint and intermediate said ends in a single plane.

11. An apparatus as claimed in claim 9 wherein said fixed support comprises a first pair of oppositely inclined surfaces facing generally in opposite directions and toward each other to define therebetween a space which is uniform in cross section in planes normal to and spaced along an axis extending between and parallel to said pair of surfaces and said means for supporting said anvil means comprises a second pair of oppositely inclined surfaces receivable in said space in mating relationship with said first pair of surfaces.

12. Apparatus as claimed in claim 9 further including means for providing a first signal representative of said rectilinear movement and means for providing a second signal representative of the force exerted by the tread of a tire on said anvil means in the direction of said rectilinear motion.

13. Apparatus as claimed in claim 12, further including means for converting said first and said second signals into a stress-strain curve.

14. Apparatus as claimed in claim 12 wherein said rotatable means is engageable with a tire tread adjacent the ends of the footprint provided by the engagement of the rotatable means and tire tread and is engageable with said tread intermediate said ends of said footprint all in a single plane; said fixed support comprises a first pair of oppositely inclined surfaces facing generally in opposite directions and toward each other to define therebetween a space which is uniform in cross section in planes normal to and spaced along an axis extending between and parallel to said pair of surfaces; and said means for supporting said anvil means comprises a second pair of oppositely inclined surfaces receivable in said space in mating relationship with said first pair of surfaces.